United States Patent
O'Hare et al.

(10) Patent No.: US 10,466,059 B2
(45) Date of Patent: Nov. 5, 2019

(54) PROVIDING ALTERNATIVE ROUTING OPTIONS TO A RIDER OF A TRANSPORTATION MANAGEMENT SYSTEM

(71) Applicant: Uber Technologies, Inc., San Francisco, CA (US)

(72) Inventors: John Christopher O'Hare, San Francisco, CA (US); Maya Paritosh Choksi, San Francisco, CA (US); Evelyn Kim, San Rafael, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/809,948

(22) Filed: Nov. 10, 2017

(65) Prior Publication Data

US 2018/0066947 A1    Mar. 8, 2018

Related U.S. Application Data

(63) Continuation of application No. 15/197,518, filed on Jun. 29, 2016, now Pat. No. 9,857,188.

(51) Int. Cl.
*G01C 21/34* (2006.01)
*G01C 21/36* (2006.01)

(52) U.S. Cl.
CPC ..... *G01C 21/3453* (2013.01); *G01C 21/3415* (2013.01); *G01C 21/3626* (2013.01); *G01C 21/3676* (2013.01)

(58) Field of Classification Search
CPC ............ G01C 21/3415; G01C 21/3453; G01C 21/3626; G01C 21/3676
USPC ......................................................... 701/417
See application file for complete search history.

(56) References Cited

U.S. PATENT DOCUMENTS

| | | | |
|---|---|---|---|
| 6,928,365 B2 | 8/2005 | Sakai | |
| 7,778,773 B2 | 8/2010 | Yaqub et al. | |
| 8,121,780 B2 | 2/2012 | Gerdes et al. | |
| 9,494,439 B1 * | 11/2016 | Ross | B60W 50/029 |
| 9,857,188 B1 * | 1/2018 | O'Hare | G01C 21/3453 |
| 2007/0276595 A1 | 11/2007 | Lewinson et al. | |
| 2008/0275643 A1 | 11/2008 | Yaqub et al. | |

(Continued)

OTHER PUBLICATIONS

United States Office Action, U.S. Appl. No. 15/197,518, dated Jun. 2, 2017, 11 pages.

*Primary Examiner* — Atul Trivedi
(74) *Attorney, Agent, or Firm* — Fenwick & West LLP

(57) ABSTRACT

A transportation management system coordinates the transportation of riders by drivers integrated with the system. To provide control to the rider of the route used during a trip provided by a given driver, the transportation management system computes several alternative routing options between the trip's origin location and destination location. These alternative routing options may be computed according to the rider's preferences and/or based on different optimization functions that optimize various trip parameters, for example, cost, time, traffic, and distance. The rider selects one of the alternative routing options as the preferred route between the origin location and the destination location. The transportation management system automatically communicates the routing option selected by the rider to the driver without requiring the rider to personally tell the driver of her preference.

20 Claims, 5 Drawing Sheets

(56) References Cited

U.S. PATENT DOCUMENTS

| | | | |
|---|---|---|---|
| 2009/0326991 A1* | 12/2009 | Wei | G06Q 10/02 705/5 |
| 2011/0153629 A1 | 6/2011 | Lehmann et al. | |
| 2011/0224898 A1 | 9/2011 | Scofield et al. | |
| 2012/0078672 A1* | 3/2012 | Mohebbi | G06Q 10/0631 705/7.12 |
| 2013/0046456 A1* | 2/2013 | Scofield | G01C 21/3423 701/117 |
| 2013/0110385 A1* | 5/2013 | Heed | G06Q 10/047 701/117 |
| 2013/0204520 A1* | 8/2013 | Nomura | G01C 21/3658 701/411 |
| 2013/0282271 A1* | 10/2013 | Rubin | G08G 9/02 701/423 |
| 2014/0278052 A1* | 9/2014 | Slavin | G01C 21/3492 701/400 |
| 2014/0278061 A1 | 9/2014 | Michael | |
| 2015/0161564 A1 | 6/2015 | Sweeney et al. | |
| 2015/0323329 A1 | 11/2015 | Lord et al. | |
| 2016/0042303 A1* | 2/2016 | Medina | G06Q 10/02 705/5 |
| 2016/0109251 A1* | 4/2016 | Thakur | G01C 21/3415 705/335 |
| 2016/0223347 A1 | 8/2016 | Ricci et al. | |
| 2016/0334230 A1* | 11/2016 | Ross | G01C 21/3415 |
| 2016/0334797 A1* | 11/2016 | Ross | G08G 1/20 |
| 2016/0356615 A1* | 12/2016 | Arata | G01C 21/3438 |
| 2016/0364678 A1* | 12/2016 | Cao | G06Q 50/30 |
| 2016/0364679 A1* | 12/2016 | Cao | G06Q 10/083 |
| 2016/0364812 A1* | 12/2016 | Cao | G06Q 50/01 |
| 2016/0364823 A1* | 12/2016 | Cao | G06Q 50/30 |
| 2017/0090480 A1* | 3/2017 | Ho | G05D 1/0214 |
| 2017/0123421 A1* | 5/2017 | Kentley | G01S 17/87 |
| 2017/0138749 A1* | 5/2017 | Pan | G01C 21/3438 |
| 2017/0192437 A1* | 7/2017 | Bier | G05D 1/0038 |
| 2018/0136005 A1* | 5/2018 | Forutanpour | G01C 21/343 |
| 2018/0268359 A1* | 9/2018 | Soubhagya | G06Q 10/08 |
| 2018/0356237 A1* | 12/2018 | Abramson | G01C 21/3415 |
| 2019/0005812 A1* | 1/2019 | Matus | G08G 1/0133 |
| 2019/0101401 A1* | 4/2019 | Balva | G01C 21/3438 |

* cited by examiner

PROVIDING ALTERNATIVE ROUTING OPTIONS TO A RIDER OF A TRANSPORTATION MANAGEMENT SYSTEM

CROSS REFERENCE TO RELATED APPLICATIONS

This application is a continuation of U.S. application Ser. No. 15/197,518, filed Jun. 29, 2016, which is incorporated by reference in its entirety.

TECHNICAL FIELD

This disclosure generally relates to the field of transportation systems and, more particularly, to enabling a rider using a transportation management system to select a route to be used by a driver to transport the rider to a destination location.

BACKGROUND

Transportation management systems provide support for the logistical issues in managing the transportation of persons, cargo or the like. In some transportation management systems, a driver provides transportation services to a rider to a location selected by the rider; the particular instance of driver transporting a rider is called a trip. In typical systems, when transporting the rider to the selected location, the driver follows her personal preferences in selecting the route to the selected location or follows a route provided by a mapping service. In order to travel a route preferred by the rider, the rider, in such systems, would have to explicitly ask the driver to use the preferred route. This not only requires the rider to be aware of alternative routes and her preferences, but also engage in an undesirable interaction with the driver.

SUMMARY OF INVENTION

To provide control to the rider of the route used during a trip provided by a given driver, a transportation management system computes several routing options between the trip's origin location and destination location. In some examples, the routing options can include a default routing option and one or more alternative routing options. The routing options may optimize for different parameters, such as cost to the rider, duration of the trip, and/or traffic congestion along the trip. These routing options are provided via a rider client application to the rider prior to the trip commencing (or alternatively, in another example, after the trip commences and the rider is being transported), and the rider may select one of the alternative routing options as the preferred route between the origin location (or alternatively, the current location) and the destination location. The transportation management system communicates data corresponding to the routing option selected by the rider to the driver via a driver client application. This enables the rider's preferred route to be communicated to the driver without requiring the rider to personally tell the driver of her preference and without requiring the driver to provide additional input on the driver client application. Further, the transportation management system monitors the actual route used or being followed by the driver during the trip and compares the actual route against the route selected by the rider and makes any necessary adjustments. A deviation from the rider-selected route causes the transportation management system to communicate a new routing option to the driver that is generated based on the rider-selected routing option and updates the driver's performance rating accordingly.

DETAILED DESCRIPTION

System Architecture

Figure 1:
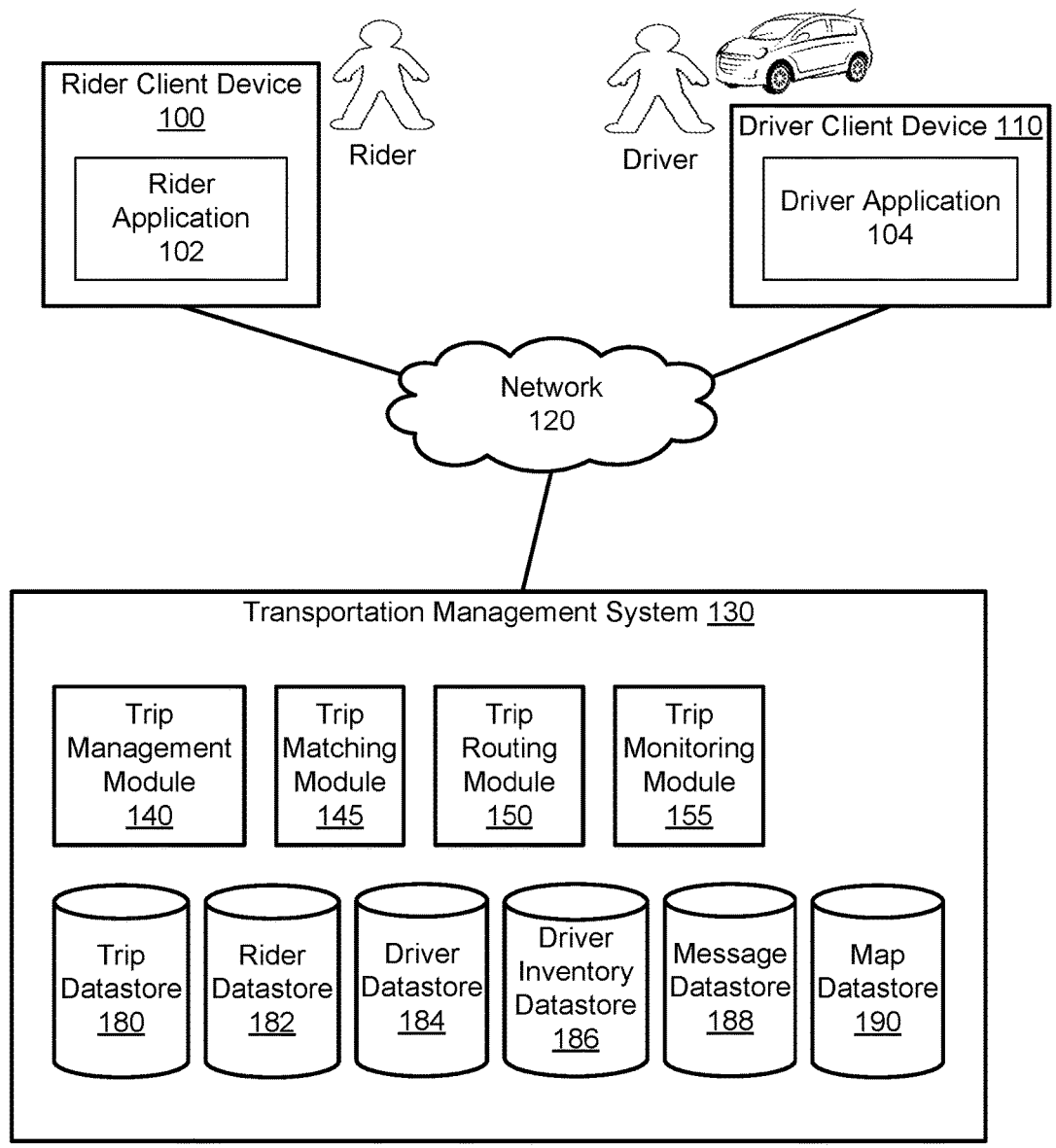
FIG. 1 illustrates the system environment for an example transportation management system.

Turning now to the specifics of the system architecture, FIG. 1 illustrates the system environment for an example transportation management system 130. Transportation management system 130 coordinates the transportation of persons and/or goods/items for a user ("rider") by a travel provider ("driver"). The driver uses a vehicle to provide the transportation to the rider. In this example embodiment, the transportation management system 130 includes, a trip management module 140, a trip matching module 145, a trip routing module 150, a trip monitoring module 155, and various data stores including a trip data store 180, a rider data store 182, a driver data store 184, a driver inventory data store 186, a message data store 188, and a map data store 190. According to some examples, these modules and data stores are not native components of a generic computer system, and provide structures and functions beyond the generic functions of a computer system, as further described below.

A rider operates client device 100 that executes a rider client application 102 that communicates with transportation management system 130. The rider operates the client application 102 to make a trip request from the transportation management system 130 for a delivery or transport service ("a trip") of the rider (and, optionally, additional persons) and/or items, for example cargo needing transport. The rider client application 102 enables the rider to specify an origin location and, optionally, a destination location associated with the trip. An origin location or a destination location may be a location inputted by the user or may correspond to the current location of the client device 100 as determined automatically by a location determination module (not shown) in the client device 100, e.g., a GPS system, a wireless networking system, or a combination thereof.

The rider client application 102 transmits a trip request initiated by a user to the transportation management system 130 over the network(s) 120. The trip request identifies the rider and at least the origin location specified by the rider (e.g., and can also include other data, such as a user identifier, a mobile device identifier, a vehicle type, etc.). The transportation management system 130 uses the trip request to match the rider with available drivers, one of whom will be selected to pick up the rider and transport the rider to the desired destination. The rider client application 102 further enables a rider to provide a performance rating for a driver upon completion of a trip. In one embodiment, the rating is provided on a scale of one to five, five being the maximal (best) rating.

The driver operates a client device 110 executing a driver application 104 that communicates with the transportation management system 130 to provide information indicating whether the driver is available or unavailable to provide transportation services to riders. In one embodiment, the driver application 104 enables the driver to provide information regarding availability by logging into the transportation management system 130 and activating a setting that they are currently available to provide trips. The driver application 104 also periodically provides the current location of the client device 110 to the transportation management system 130. Depending on implementation, the current location may be a location inputted by the driver or may correspond to the current location of the client device 110 as determined automatically by a location determination module (not shown) in the client device 110, e.g., a GPS system, a wireless networking system, or a combination thereof. The driver application 104 further allows a driver to receive, from the trip matching module 145, an invitation to provide a transport service for a rider. For example, after the transportation management system 130 receives a trip request from a rider, the trip matching module 145 can select a driver to provide a transportation service for the rider based on one or more criteria (e.g., the origin location of the rider, the destination location of the rider, the current location of the driver, the destination location of the driver, the status of the driver or driver application 104, the vehicle type of the driver, etc.), and transmit an invitation to the client device 110 of the selected driver to provide the transportation service for the rider. The driver can then accept or decline the invitation by providing input on the driver application 104. If the driver accepts the invitation, the driver can be assigned the trip and can be provided information to travel to the pickup location (or origin location) of the rider. In one example, the driver application 104 receives routing information from trip routing module 150 to guide the driver from the current location (e.g., when the invitation was accepted) to the pickup location of the rider and subsequently, can also receive routing information from the pickup location to the destination location of the rider. Depending on implementation, the routing information can correspond to a default location and/or a selected location provided by the rider. The driver application 104 enables a driver to provide a rating for of rider upon completion of a trip. In one embodiment, the rating is provided on a scale of one to five, five being the maximal (best) rating.

The rider client device 100 and driver client device 110 are portable electronic devices such as smartphones, tablet devices, wearable computing devices (e.g. smartwatches) or similar devices. Examples of such devices include smartphones, executing an corresponding operating systems and running mobile applications, including the rider application 102 and/or the driver application 104. Client devices typically have one or more processors, memory, touch screen displays, wireless networking system (e.g., IEEE 802.11), cellular telephony support (e.g. LTE/GSM/UMTS/CDMA/HSDPA, etc.), and location determination capabilities.

Data Model for the Transportation Management System

The rider data store 182 stores account and usage information for each rider who is a user of the system. For each rider, the rider data store 182 stores one or more database records associated with the rider, including both master data and usage data. In some examples, master data for a rider includes the rider's name, address information, cell phone number, payment information (e.g., credit card number), sign up date, rider acquisition type (e.g., referral, promotional code, employee); device type (e.g., type of cell phone); platform type (e.g., iOS, Android), application ID, and/or application version for the rider application 102. Usage data includes variables that characterize the rider's usage over the trips that the rider has taken using the system. These variables include at least one or more of the following:

TABLE 1

Rider Usage Variables

| Variable Name | Description |
| --- | --- |
| Number of trips | Total number of trips made by the rider. Further variations of this variable include such as the number of rides in the past 24 hours, past seven days, past month, etc. |
| Time Since Last Trip | Amount of time since the last trip by the rider. |
| Frequency of Cancelation by Rider | The percent of trip requests that the rider has canceled (e.g., number of cancelations/number of requests). |
| Frequency of Contact with Driver | The percent of times that the rider has contacted the driver (either by text or by calling) prior to being picked up by the driver e.g. number of contacts/number of trips. |
| Average Driver Rating | The average of the performance ratings given by the rider to the drivers. |
| Average Rider Rating | The average of the ratings given to the rider by the drivers of trips taken by the rider. |
| Frequency of Non-Satisfactory Rating of the Driver | The proportion of ratings given by the rider to drivers that are not satisfactory performance ratings. This is the number of times a non-satisfactory was given by the rider to a driver divided by the total number of ratings by the rider. The threshold for satisfactory ratings is a parameter set in the transportation management system 130, and may be a maximal value (e.g., 5 on a 1-5 scale) or a non-maximal value (e.g., equal to or greater than 4.00 on a 5 scale). |
| Frequency of Non-Satisfactory Rating of the Rider | The proportion of ratings given by the drivers to the rider that are not satisfactory performance ratings. Thus, in this embodiment, it would be the number of times non-satisfactory was given by drivers to the rider divided by the total number of ratings made by drivers. |

TABLE 1-continued

Rider Usage Variables

| Variable Name | Description |
|---|---|
| Number of Hours Since Last Non-Satisfactory Rating of a Driver | The number of hours that have passed since the last time the rider gave a non-satisfactory rating to a driver. |
| Routing Preferences | Preference for highways, scenic routes, routes that minimize cost, routes that minimize time. These preferences may be explicitly provided by the rider or may be learned over the rider's usage over the trips that the rider has taken using the system. |

The driver data store 184 stores account and operational information for each driver who participates in the transportation management system 130. For each driver, the driver data store 184 stores one or more database records associated with the driver, including both master data and usage data. In some examples, master data for a driver includes the driver's name; driver's license information; insurance information; vehicle information (year, make, model, vehicle ID, license plate); address information; cell phone number, payment information (e.g. credit card number); sign up date; driver service type (regular luxury pool van etc.); device type (e.g. type of cell phone); platform type (e.g. iOS, Android); application ID; and/or application version for the driver application 104. Operational variables include variables that objectively characterize the driver's operation over the trips that the driver has provided using the system. These variables include at least one or more of the following:

TABLE 2

Driver Operational Variables

| Variable Name | Description |
|---|---|
| Number of Trips by Driver | Total number of trips provided by the driver. |
| Number of Trips by Driver 4 Hour | Number of trips by made the driver in the past four hours. Other variations include number of trips in past 24 hours past week past month etc. |
| Time since shift start | Number of hours that the driver has been active in this shift. |
| Number of Hours Since Last Non-Satisfactory Rating of the Driver | The number of hours that have elapsed since the driver received a non-satisfactory rating from a rider. |
| Frequency of Cancelation by Driver | The percent of trip requests that the driver has canceled (e.g., number of cancelations/number of requests accepted by the driver. |
| Average Driver Rating | The average of the performance ratings given to the driver by riders. |
| Average Driver Rating | The average of the ratings given by the driver to riders in trips provided by the driver. |
| Frequency of Non-Satisfactory Rating of the Driver | The proportion of ratings given to the driver by riders that are not satisfactory performance ratings. Thus, in this embodiment, it would be the number of times a rating of less than 5 was given to the driver to by a rider divided by the total number of ratings by the driver. |
| Frequency of Non-Satisfactory Rating of the Rider | The proportion of ratings given by the driver to the riders that are not satisfactory ratings. Thus, in this embodiment, it would be the number of times a rating of less than 5 was given by the driver divided by the total number of ratings made by the driver. |
| Number of Hours Since Last Non-Satisfactory Rating of a Rider | The number of hours that have passed since the last time the driver give a non-satisfactory rating to a rider. |
| Number of Complaints against Driver | Number of complaints made by riders with respect to the driver. |

Additional variables may also be developed for either the rider or the driver, for example, the probability of the rider traveling during particular periods and the probability of a driver being available during such periods. Any of the foregoing variables may be weighted with respect to time so that more recent trips are weighted more heavily in any computation of the metric over older trips to provide a greater reflection of the rider's or driver's current behavior given that behavior and expectations can change over time.

The trip data store 180 maintains a record of each in-progress and completed trip coordinated by the transportation management system 130. More specifically, each trip provided by a driver to a rider is characterized by a set of attributes (or variables), which together form a trip record that is stored in the trip data store 180. The attributes describe aspects of the driver, the rider, and the trip. In one embodiment, each trip record includes a trip identifier (ID), a rider ID, a driver ID, the origin location, the destination location, the duration of trip, the service type for the trip, estimated time of pick up, actual time of pickup, and driver rating by rider, rider rating by driver, fare information, market information, and/or other environmental variables as described below. The variables for the trip record are thus drawn from multiple sources, including the rider's master and usage records in the rider data store 182, the driver's master and operational records in the driver data store 184, and specific variables captured and received during each trip.

A trip record in the trip data store 180 may optionally include additional variables that relate to the characteristics of the specific trip, the behavior of the driver, or experimental variables. For example, the trip record may include telematics information, for example maximal acceleration amounts by the vehicle, the number of times the driver deviated from a designated route by missing a turn or an exit, the number of times the driver stopped, the number of times the driver exceed a posted speed limit, and so forth. The trip record may also include variables indicating messages that the driver or the rider received in connection with the trip as well as responses to questions presented to the rider or the driver.

In one embodiment, the trip data store 180 contains one or more of the following variables for each trip:

TABLE 3

Trip Record Variables

| Variable Name | Description |
|---|---|
| Trip ID | Identifier of the specific trip |
| RiderID | Identifier of the rider |
| DriverID | Identifier of the driver |
| Status | Current status of trip (pending, in-progress, completed, etc.) |
| Vehicle Type | Type of driver's vehicle (e.g. coupe, sedan, SUV, minivan, limo, etc.) |
| Vehicle Age | Age of driver's vehicle in years |
| City | City of service |
| Date/time | The date and time that the trip was requested. |
| RiderEmployee? | Whether the rider is an employee of the provider of the transportation management system 130. |
| Service type | The class of service provided by the driver such as standard, pool, luxury, van, and the like. |
| Estimated Time of Arrival and | The estimated time of arrival is an estimate of the amount of time (in seconds) that it should take for the driver to reach the rider's origin location given the current location of the driver at the time the driver selected the trip request for the rider. |
| Actual Time of Arrival | The Actual Time of Arrival is the actual amount of time it, in fact, took as determined from either an input received from the driver application that the driver has picked up the rider or a comparison of the location of driver's vehicle to the origin location. |
| ExtraETATime | The Extra ETA Time is a calculation of the extra time taken to reach the origin location relative to the estimate, e.g.: Extra ETA Time = (Actual Time of Arrival − Estimate Time of Arrival)/Estimated Time of Arrival. In this formulation larger positive values are indicative of increasing wait times for the rider; larger negative values are indicative of the driver arriving earlier than estimated. |
| Trip Distance | The actual distance of the completed trip. |
| Trip Duration | The actual amount of time for the completed trip as measured from the time of rider pickup to the time the driver indicates that the trip is completed |
| Trip Average Speed | Trip distance divided by trip duration |
| Surge Pricing | A multiplier (>1.0) applied during peak demand times |
| Fare | The amount charged for the trip. |
| Payment Credit | An indicator as to whether the fare was paid for with promotional or other types of credits. |
| Estimated Trip Duration | An estimate of the amount of time for the trip. |
| Extra Trip Time | The Extra Trip Time is a calculation of the extra time taken to reach the destination location relative to the estimated trip duration e.g.: Extra Trip Time = (Actual Trip Duration − Estimated Trip Duration)/Estimated Trip Duration. |
| Congestion Estimate | An estimate of the excess time associated with traveling the selected route for the trip due to traffic impact. This value may be computed as the ratio (timeActual/timeOptimal) − 1. |
| Number of Trip Reroutings | For the driver, the average number of times per trip that a supplied route for the trip had to be rerouted as a result of the driving missing an expected turn or exit. |
| Maximum Lateral Acceleration | Maximum readings of acceleration as measured by the driver's device 110. |
| Maximum Deceleration | Maximum reading of deceleration (braking) as measured by the driver's device 110. |
| Waiting Time by Driver | Time between the driver's arrival at the origin location and the time the trip started as indicated by the driver. |
| DriverMessageList | List of message IDs or other identifiers of messages provided to the driver's client application 104 |
| RiderMessageList | List of message IDs or other identifiers of messages provided to the rider client application 102 |
| DriverResponseList | List of responses (by ID or text values) received from the driver's client application 104 in response to question messages. |
| RiderResponseList | List of responses (by ID or text values) received from the rider's client application 102 in response to question messages. |

TABLE 3-continued

Trip Record Variables

| Variable Name | Description |
|---|---|
| Rider Rating | The rating of the rider by the driver. |
| Driver Performance Rating | The performance rating of the driver by the rider. The rating can be expressed in a scale (e.g., 1-5, where 5 is a maximal rating), positive/negative scale (e.g., "thumbs up/thumbs down"). |

Matching Trip Requests with Drivers

The trip management module 140 is configured as a communicative interface between the client application 102, the driver application 104, and the various modules and data stores in the transportation management system 130, and is one means for performing this function. The trip management module 140 is configured to receive driver availability status information and current location information from the driver client application 102 and update the driver inventory data store 186 with the availability status. The trip management module 140 is also configured to receive trip requests from the rider client application 102 and creates corresponding trip records in the trip data store 180. A trip record corresponding to an unprocessed trip request has a trip ID, a rider ID, an origin location, a destination location, and a status indicating that the corresponding trip request has not been processed.

The trip matching module 145 processes a trip request by selecting a currently available driver to provide the transportation service associated with the trip request, and is one means for performing this function. In one embodiment, the matching or selecting is based in part on the current location (or origin location) of the rider and the current location of the driver in their vehicle, as provided by the location determination capabilities of their respective devices 100 and 110.

Figure 2:
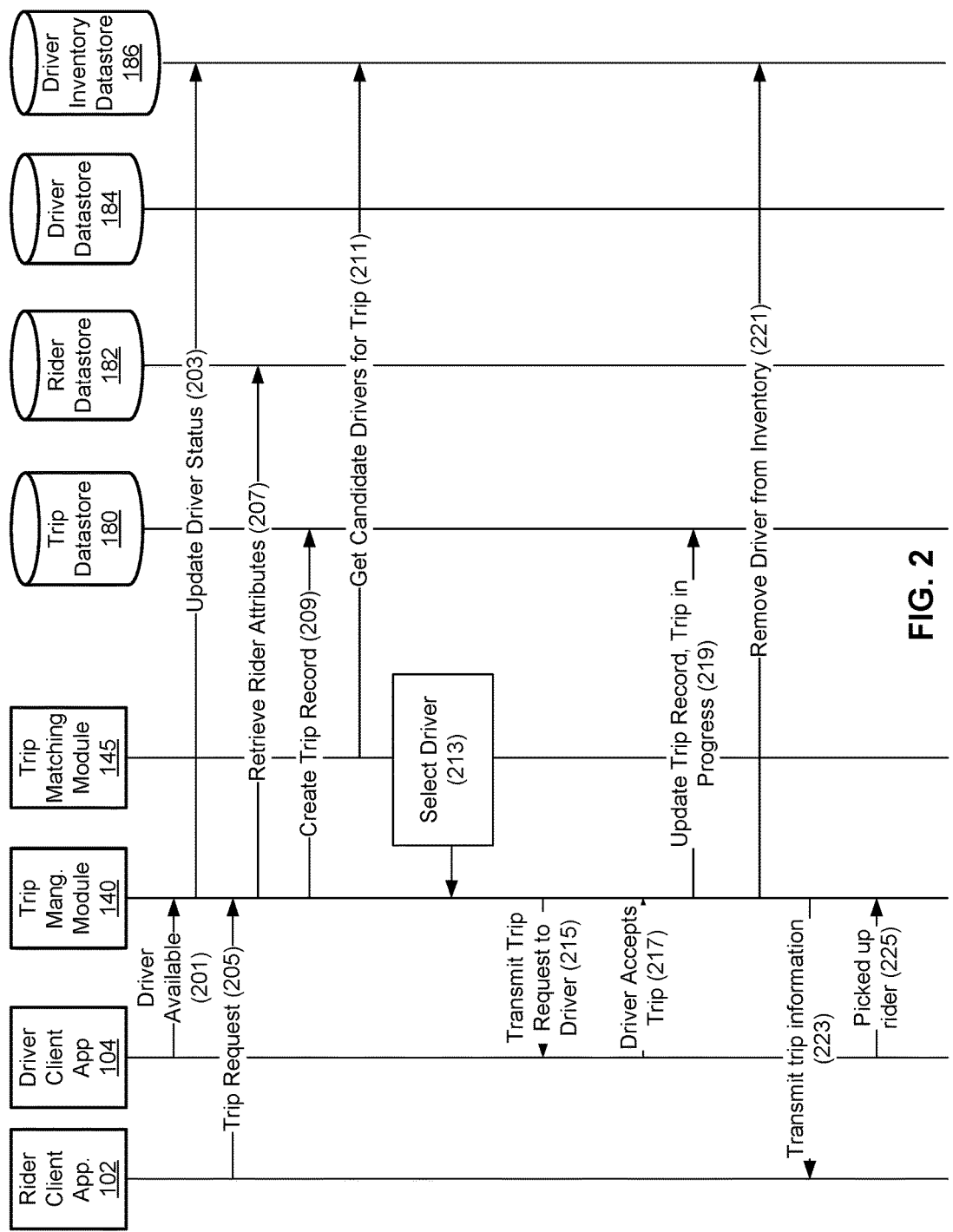
FIG. 2 illustrates an interaction diagram for an algorithm for matching candidate drivers for a given trip request issued by a rider.

FIG. 2 illustrates an interaction diagram for an algorithm for matching a currently available driver with a trip request received from the rider client application 102.

At 201, the driver uses the driver application 104 to transmit a message the trip management module 140 indicating that the driver is available for transporting riders. In response, at 203, the trip management module 140 updates the status of the driver in the driver inventory data store 186 with a record indicating the driver is available for matching, and location of the driver (which gets updated periodically). This step occurs repeatedly over the pool of drivers.

At 205, the trip management module 140 separately receives a trip request from a rider using the rider client application 102. The trip request includes the rider's current location or specified pickup location (typically the origin location) and/or an intended destination location. In some examples, a destination location is not required. In response, at 207, the trip management module 140 processes the trip request (e.g., by authenticating the rider and/or retrieving the rider's attributes from the rider's master record in the rider data store 182) and, at 209, creates a trip record in the trip data store 180. The status of the newly created record is set to "Pending" or another state indicating that the trip request has not yet been processed. Such a trip is referred to herein as a "pending trip."

At 211, the trip matching module 145, in one example, receives the trip request and/or monitors the unprocessed trip request in the trip data store 180, and determines, from the driver inventory data store 186, which drivers are potential candidates to pick up the rider for the newly created trip. For example, for the pending trip, the trip matching module 145 identifies a set of candidate drivers who are within a configurable maximum distance or within a maximum estimated travel time from the origin location.

At 213, the trip matching module 145 selects a first driver from the set of candidate drivers to provide the transportation service associated with the trip request based on the driver's estimated time of arrival (and/or distance) to the rider's pickup location, i.e., the origin location (and/or other factors, in other examples). Alternatively, the trip matching module 145 may select some number or percentage of the top-ranked candidate drivers (e.g. top 10%) and then select a driver from the top-ranked drivers. The percentage can be a function of the number of candidate drivers such that, as the number of candidate drivers increases, the top percentage for selection becomes smaller and thus only the top-ranked drivers are given notice of the pending trip request.

At 215, the trip management module 140 transmits, to the driver application 104 of the selected driver, a driver trip invitation to provide the transportation service for the rider. The invitation can include information about the origin location and rider information (and/or destination location). At 217, the driver may use his or her respective driver application 104 to accept the invitation. The driver application 104 transmits a notification to the trip management module 140 indicating that the driver has accepted the trip.

At 219, the trip management module 140 updates the trip record associated with the selected trip in the trip data store 180 to indicate that pending trip request has been fulfilled and that the trip is now in progress. At 221, the trip management module 140 removes the driver from the pool of available drivers in the driver inventory store 184, and no longer includes the driver as a candidate for other pending requests (until after the driver completes the trip).

At 223, the trip management module 140 transmits trip information to the rider client application 102 for presentation to the rider. The trip information includes information related to the driver who selected the trip and an estimated time of arrival of the driver to the origin location.

The driver travels to the origin location of the requesting rider and picks up the rider. As the driver travels to the origin location (and as the driver travels from the origin location to the destination location), the driver client application 104 can periodically provide current location information to the trip management module 140. The trip management module 140 can update the rider client application 102 accordingly, so that the rider can view the status and location of the driver as the driver travels to the origin location. At the time the driver picks up a rider, the driver uses driver application 104 to signal, at 225, to the trip management module 140 that the rider has been successfully picked up and/or to start the transportation service. When the driver reaches the destination location, the driver uses driver application 104 to signal to the transportation management system 130 that the trip is completed and can subsequently provide a rating of the rider by the driver. The transportation management system 130 calculates a total fare to be paid by the rider for the trip based on the time and/or the distance traveled by the driver (and other fees or tolls) and communicates this information to rider application 102 and may also process payments for the rider. The transportation management system 130 marks the trip record as complete at this point and adds the driver back into the inventory of available drivers in driver inventory data store 186.

Providing Routing Options to Riders

The trip routing module 150 is configured to compute routing options from the rider's origin location to the destination location for a trip, and is one means for performing this function. A routing option specifies the route a driver may take to transport the rider from the origin location to the destination location. Although examples described herein refer to routing options as routes from the origin to the destination for purposes of simplicity, in other examples, routing options can include routes from the driver's current location to the rider's origin location and/or from the driver's current location to the origin location and then to the destination location. The trip routing module 150 can also reroute a trip based on location information received from the driver application 104, indicating for example that the driver has deviated from the recommended or rider-specified route. The trip routing module 150 accesses map data from a map data store 190 as well as short-term data to predict travel speed along the route and select a route for the trip. The trip routing module 150 may use any suitable routing algorithm, such as Dijkstra's algorithm for calculating the route between the origin and destination. The routing module 150 may also calculate the route from the location of the driver's vehicle to the origin location to assist the driver in picking up the rider. When the routing module 150 calculates the route, the routing module 150 may also calculate a distance or amount of time that the route will take. The routing module 150 may also access event and other short-term data from the map data store 190 to account for variations in routing that may occur due to this short-term data.

To provide control to the rider of the route used during a trip provided by a given driver, the trip routing module 150 is also configured to compute several alternative routing options between a trip's origin location and destination location. These alternative routing options are provided via the rider client application 102 to the rider prior to the trip commencing, and the rider may select one of the alternative routing options as the preferred route between the origin location and the destination location. The trip management module 140 is configured to communicate the routing option selected by the rider to the driver via the driver client application 104. This allows for the rider's preferred route being communicated to the driver without requiring the rider to personally tell the driver of her preference. The following discussion describes the operation of the trip management module 140 and the trip routing module 150 to provide alternative routing options to rider and communicating a rider-selected preferred routing option to the driver.

Figure 3:
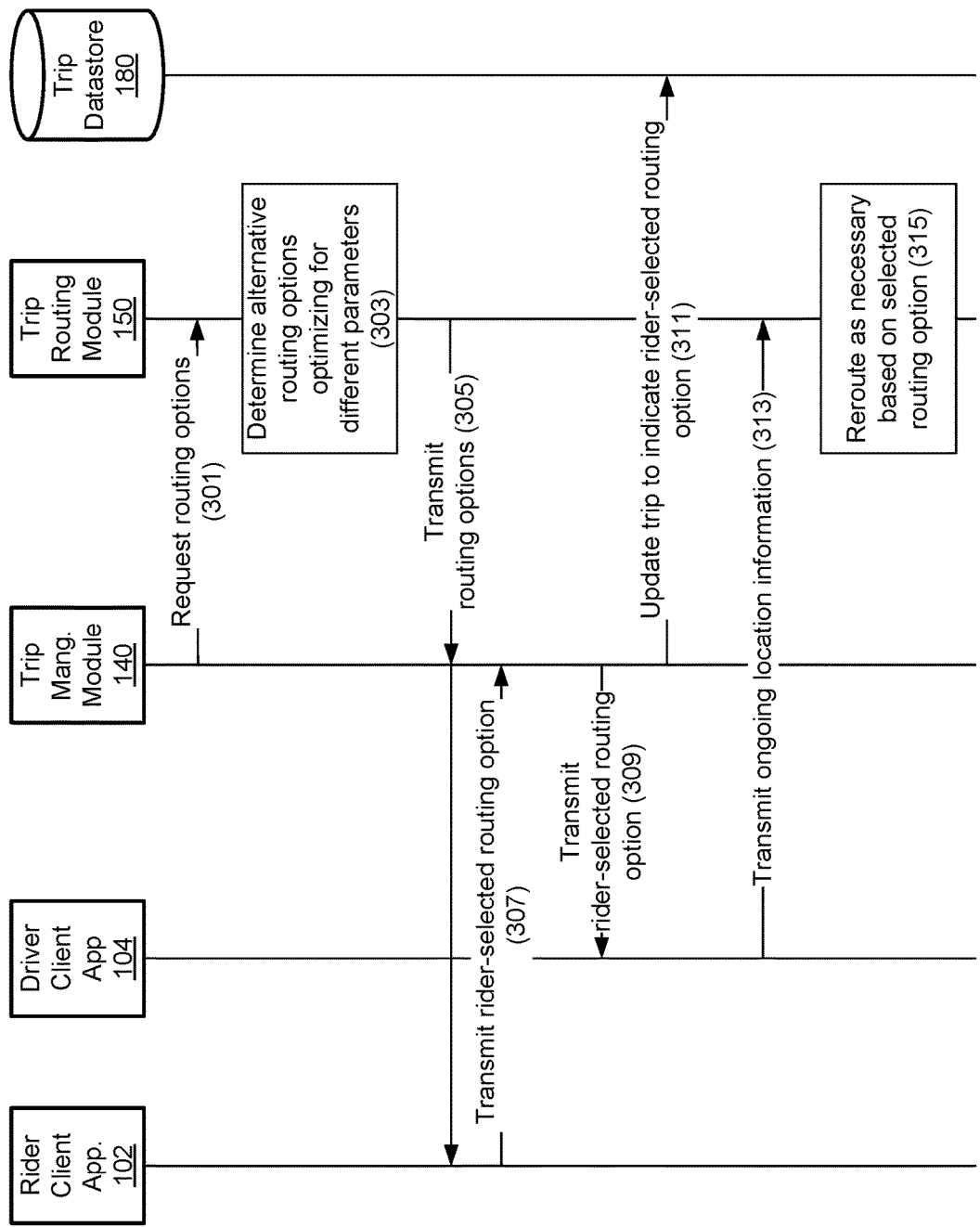
FIG. 3 illustrates an interaction diagram for an algorithm for providing a rider-selected routing option to a driver matched with the trip request.

FIG. 3 illustrates an interaction diagram for an algorithm for providing a rider-selected routing option to a driver matched with the trip request.

At 301, the trip management module 140 transmits, to the trip routing module 150, a request for alternative routing options between the origin location and the destination location associated with a trip request issued by a rider. In one embodiment, the trip management module 140 transmits the request to the trip routing module 150 when the status of a trip has been updated in the trip data store 180 to indicate that the trip is in progress. In one embodiment, the trip management module 140 provides, as a part of the request, the origin location and the destination location associated with the trip. In an alternative embodiment, the trip management module 140 provides only the trip identifier associated with the trip to the trip routing module 150, and the trip routing module 150 retrieves the origin and destination locations associated with the trip from the trip data store 180.

At 303, the trip routing module 150 determines two or more alternative routing options between the origin location and the destination location that may be presented to the rider who issued the trip request (referred to herein as the "requesting rider"). Each alternative routing option determined by the trip routing module 150 is unique from every other routing option such that the path from the origin location to the destination location is unique to each routing option. To determine the alternative routing options, the trip routing module 150 computes different routes between the origin and destination locations that each optimizes for a different parameter or combination of parameters associated with the trip and/or a business goal of the transportation management system 130. Parameters associated with the trip include, but are not limited to, cost of the trip incurred by the rider, estimated time to reach the destination location, traffic congestion along the route, safety along the route, the type of road(s) (e.g., highway, toll road, city roads, scenic road, etc.) along the route, and time of day. Parameters associated with a business goal include, but are not limited to, the quantity and type of data (e.g., traffic data, map data, and driver or rider habits/preferences) that can be collected during the trip, the amount of revenue that can be generated during the trip from various sources (e.g., advertising).

In one embodiment, the trip routing module 150 is configured with different optimization functions that each, given the origin and destination locations, computes a routing option optimized for a different parameter or a combination of parameters (the "optimized parameters"). Each optimization function is associated with a set of optimized parameters and assigns weights to the optimized parameters such that the routing option generated by the function optimizes for parameters having higher weights relative to parameters having lower weights. For example, an optimization function may assign a higher weight to the cost of the trip relative to the total distance traveled, and, therefore, the generated routing option is cheaper than the alternatives but traverses a larger distance. In one embodiment, the weights assigned to the optimized parameters of an optimization function are the same for all riders using the transportation management system 130. In alternative embodiments, the optimization functions are rider-specific, such that a given a rider's preferences impact the weights assigned to the optimized parameters. The rider's preferences may be learned over time, based on rider attributes stored in the rider data store 182, or may be expressly provided by the rider via the rider client application 102. In one embodiment, the weights assigned to the optimized parameters may be determined per trip for a given rider.

In some cases, the trip routing module 150 determines a large number of alternative routing options for a given trip and, thus, selects only a subset of the determined routing options for presentation to the rider. To select the subset of routing options, the trip routing module 150 ranks the determined alternative routing options based on the rider's preferences and/or the business goals of the transportation management system 130. The trip routing module 150 may also select the routing options to be presented based on route diversity such that the selected routing options traverse a diverse set of paths between the origin and destination locations.

Referring again to FIG. 3, at 305, the trip routing module 150 transmits the alternative routing options to the trip management module 140. The trip management module 140, in turn, transmits the alternative routing options to the rider client application 102 for presentation to the rider. The trip management module 140 may optionally store the alternative routing options in the trip data store 180 in association with the trip for which the routing options are determined. Each routing option may be stored with a unique route ID.

Figure 4:
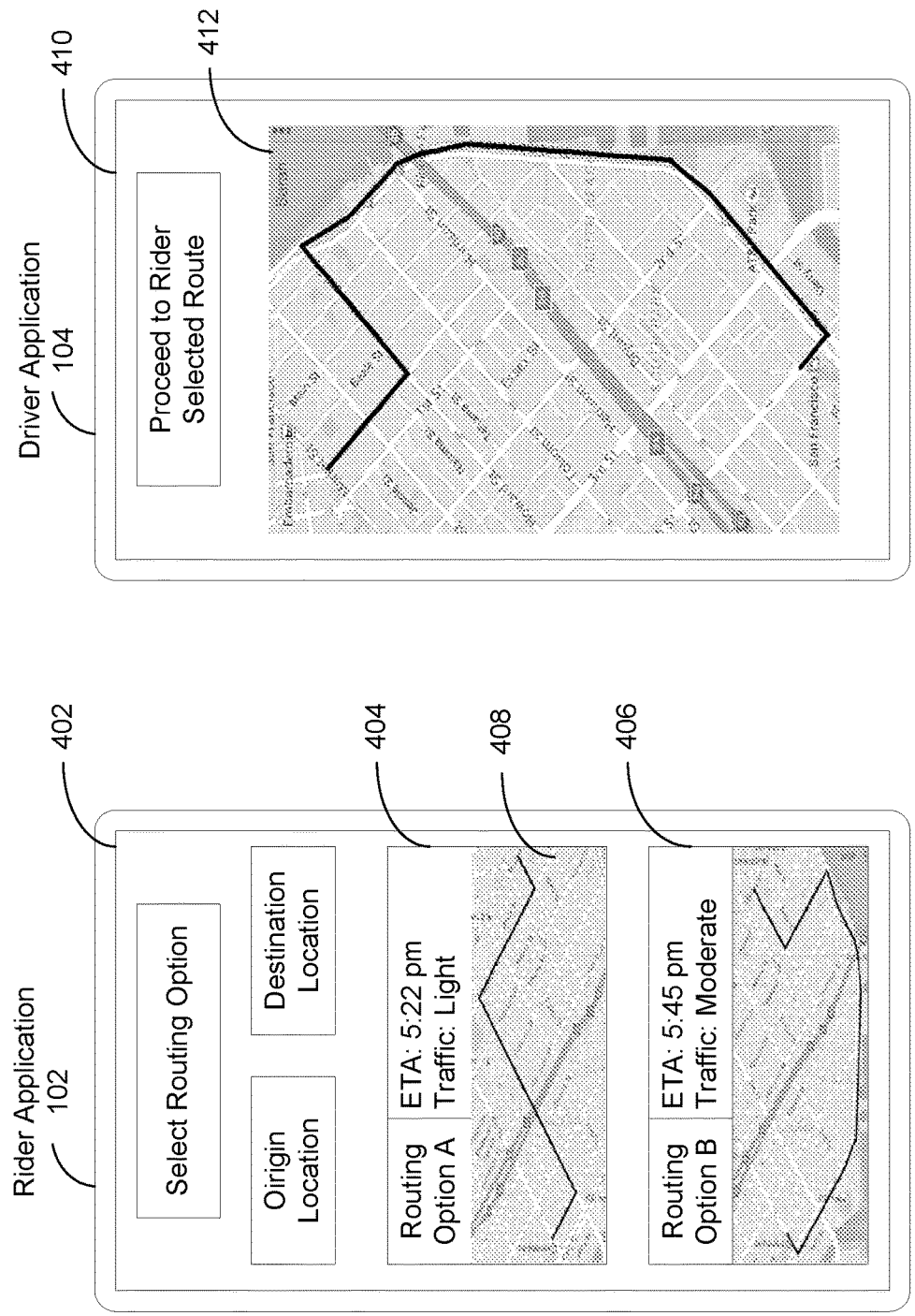
FIG. 4A illustrates a user interface on the rider client application for displaying alternative routing options.
FIG. 4B illustrates a user interface on the driver client application for displaying a rider-selected routing option.

The rider client application 102 presents the alternative routing options to the rider and provides the rider with the ability to select a routing option from presented routing options. FIG. 4A illustrates a user interface 402 on the rider client application 102 for displaying alternative routing options. In the illustration, the user interface 402 displays the origin location, the destination location, and routing options 404 and 406. The presentation of each of the routing options 404 and 406 includes information about the respective routing option, for example, the estimated time of arrival and the amount of traffic on the route, and a map, e.g. map 408, that visually displays the route from the origin location to the destination location. In one embodiment, the routing options 404 and 406 are individually selectable such that the rider may manipulate the user interface 402 to select the preferred routing option.

Referring back to FIG. 3, at 307, in response to the rider selecting a routing option, the rider client application 102 transmits the rider-selected routing option to the trip management module 140. In one embodiment, the rider client application 102 transmits the unique route ID associated with the routing option to the trip management module 140, and the trip management module 140 retrieves the information associated with the selected routing option from the trip data store 180.

At 309, the trip management module 140 transmits the rider-selected routing option to the driver client application 104 for presentation to the driver. In one embodiment, the driver client application 104 presents the rider-selected routing option to the driver in a manner that visually indicates to the driver that the rider selected the routing option. The driver client application 104 may also display messages to the driver indicating the importance of using the rider-selected routing option when transporting the rider from the origin location to the destination location. FIG. 4B illustrates a user interface 410 on the driver client application 104 for displaying a rider-selected routing option. In the illustration, the user interface 410 includes At 311, the trip management module 140 updates the trip record associated with the trip and stored in the trip data store 180 to reflect the rider-selected routing option as the preferred route for the trip. At 313, the trip routing module 150 receives location information for the driver's vehicle during the trip. At 315, the trip routing module 150, upon determining that the driver has deviated from the rider-selected routing option, determines an alternative route for the trip based on the rider-selected routing option.

In one embodiment, during the trip, the trip monitoring module 155 optionally receives information from the driver's client application 104 indicating the location of the driver's vehicle and telematics information (e.g. such indications of current speed acceleration/deceleration events stops and so forth). The trip monitoring module 155 stores deviations from the rider-selected routing option in the trip record stored in the trip data store 180. These deviations may factor into the driver's performance ratings over time.

In such a manner, the rider being transported from an origin location to a destination location is involved in the process of selecting the preferred route on the trip and can provide her preference to the driver with minimal friction or express interaction with the driver. The driver's adherence to the rider-selected route is monitored and may factor into the driver's overall performance rating.

Hardware Diagrams

Figure 5:
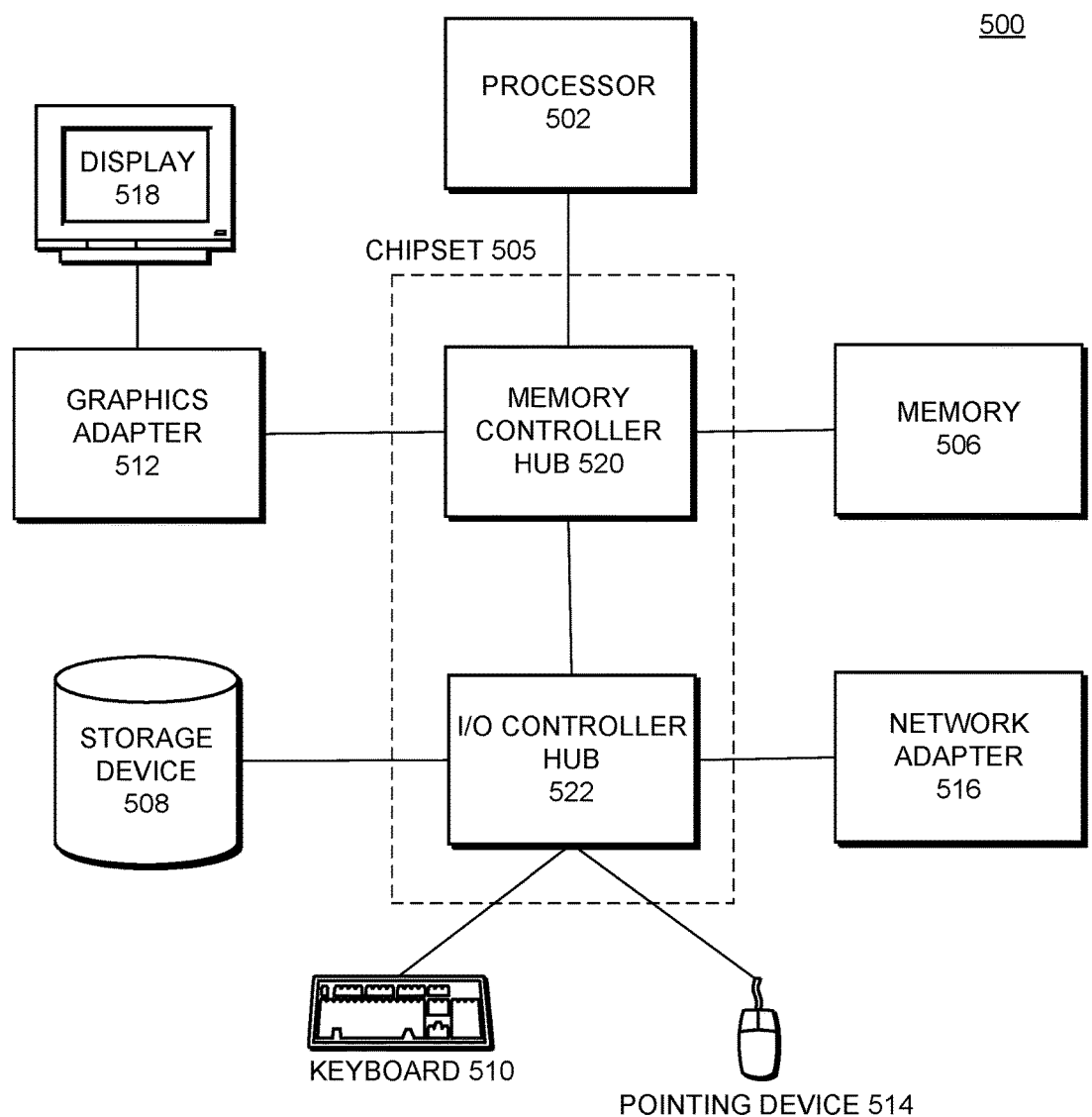
FIG. 5 illustrates physical components of a computer used as part or all of the transportation management system, the rider client device, and/or the driver client device.

FIG. 5 is a high-level block diagram illustrating physical components of a computer 500 used as part or all of the transportation management system 130, rider client device 100, or driver client device 110 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500, such as a host or smartphone, may lack a graphics adapter 512, and/or display 518, as well as a keyboard or external pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly the disclosure of the embodiments of the invention is intended to be illustrative but not limiting of the scope of the invention which is set forth in the following claims.

We claim:

1. A method for providing user-selected routes to a driver using a transportation management system, the method comprising:
   determining a plurality of different routes associated with a trip request of a user for travel from an origin location to a destination location, each route optimized according to a different combination of trip parameters;
   transmitting the plurality of routes to a client device of the user for display to the user;
   receiving from the user client device a selection of a route in the plurality of routes; and
   transmitting the selected route to a driver client device associated with a driver selected to transport the user from the origin location to the destination location.

2. The method of claim 1, wherein determining the plurality of routes comprises computing each of the routes based on a different optimization function that assigns weights to a combination of trip parameters associated with the optimization function.

3. The method of claim 2, wherein a weight assigned to a first trip parameter is set according to preferences of the user identified based on previous trips taken by the user using the transportation management system.

4. The method of claim 2, wherein a weight assigned to a first trip parameter is set according to preferences provided by the user to the transportation management system.

5. The method of claim 1, wherein a trip parameter according to which a first route is optimized is selected from a group consisting of: an estimated cost to the user, an estimated time to reach the destination location, an amount of traffic congestion along the first route, safety along the first route, type(s) of road(s) along the first route, and a time of day associated with the trip request.

6. The method of claim 1, further comprising, responsive to determining that the driver has deviated from the selected route, determining based on the selected route an alternative route for transporting the user to the destination location.

7. The method of claim 1, further comprising, responsive to determining that the driver has deviated from the selected route, updating a performance rating associated with the driver to indicate that the driver did not adhere to the selected route.

8. The method of claim 1, wherein transmitting the plurality of routes to the user client device comprises transmitting, for each route, a specified path for traveling from the origin location to the destination location and an estimated time of arrival at the destination location.

9. The method of claim 1, wherein transmitting the selected route to the driver client device comprises transmitting a notification to the driver client device indicating that the selected route was selected by the user.

10. A non-transitory computer-readable storage medium having instructions executable by a processor, the instructions comprising:
    instructions for determining a plurality of routes associated with a trip request of a user for travel from an origin location to a destination location, each route optimized according to a different combination of trip parameters;
    instructions for transmitting the plurality of routes to a client device of the user for display to the user;
    instructions for receiving from the user client device a selection of a route in the plurality of routes; and
    instructions for transmitting the selected route to a driver client device associated with a driver selected to transport the user from the origin location to the destination location.

11. The non-transitory computer-readable storage medium of claim 10, wherein determining the plurality of routes comprises computing each of the routes based on a different optimization function that assigns weights to a combination of trip parameters associated with the optimization function.

12. The non-transitory computer-readable storage medium of claim 11, wherein a weight assigned to a first trip parameter is set according to preferences of the user identified based on previous trips taken by the user using the transportation management system.

13. The non-transitory computer-readable storage medium of claim 11, wherein a weight assigned to a first trip parameter is set according to preferences provided by the user to the transportation management system.

14. The non-transitory computer-readable storage medium of claim 10, wherein a trip parameter according to which a first route is optimized is selected from a group consisting of: an estimated cost to the user, an estimated time to reach the destination location, an amount of traffic congestion along the first route, safety along the first route, type(s) of road(s) along the first route, and a time of day associated with the trip request.

15. The non-transitory computer-readable storage medium of claim 10, the instructions further comprising instructions for, responsive to determining that the driver has deviated from the selected route, determining based on the selected route an alternative route for transporting the user to the destination location.

16. The non-transitory computer-readable storage medium of claim 10, the instructions further comprising instructions for, responsive to determining that the driver has deviated from the selected route, updating a performance rating associated with the driver to indicate that the driver did not adhere to the selected route.

17. The non-transitory computer-readable storage medium of claim 10, wherein transmitting the plurality of routes to the user client device comprises transmitting, for each route, a specified path for traveling from the origin location to the destination location and an estimated time of arrival at the destination location.

18. The non-transitory computer-readable storage medium of claim 10, wherein transmitting the selected route to the driver client device comprises transmitting a notification to the driver client device indicating that the selected route was selected by the user.

19. A computer system comprising:
a computer processor; and
a non-transitory computer-readable storage medium storing instructions executable by the computer processor, the instructions comprising:
    instructions for determining a plurality of different routes associated with a trip request of a user for travel from an origin location to a destination location, each route optimized according to a different combination of trip parameters;
    instructions for transmitting the plurality of routes to a client device of the user for display to the user;
    instructions for receiving from the user client device a selection of a route in the plurality of routes; and
    instructions for transmitting the selected route to a driver client device associated with a driver selected to transport the user from the origin location to the destination location.

20. The computer system of claim 19, wherein determining the plurality of routes comprises computing each of the routes based on a different optimization function that assigns weights to a combination of trip parameters associated with the optimization function.

* * * * *